US012576581B2

(12) United States Patent
Fan et al.

(10) Patent No.: US 12,576,581 B2
(45) Date of Patent: Mar. 17, 2026

(54) INTERLAYER STRENGTHENING METHOD FOR CONTINUOUS FIBER ADDITIVE MANUFACTURING BASED ON PRESSURE INJECTED Z-PIN-LIKE STRUCTURES

(71) Applicant: NANJING UNIVERSITY OF AERONAUTICS AND ASTRONAUTICS, Nanjing (CN)

(72) Inventors: Congze Fan, Nanjing (CN); Wenzhe Song, Nanjing (CN); Zhongde Shan, Nanjing (CN); Jinghua Zheng, Nanjing (CN); Yiwei Chen, Nanjing (CN); Yaxing Song, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 19/209,761

(22) Filed: May 15, 2025

(65) Prior Publication Data

US 2025/0319648 A1      Oct. 16, 2025

Related U.S. Application Data

(63) Continuation of application No. PCT/CN2025/071941, filed on Jan. 13, 2025.

(30) Foreign Application Priority Data

Apr. 16, 2024     (CN) .......................... 202410455738.0

(51) Int. Cl.
B29C 64/106          (2017.01)
B29C 64/393          (2017.01)
(Continued)

(52) U.S. Cl.
CPC .......... B29C 64/106 (2017.08); B29C 64/393 (2017.08); B33Y 10/00 (2014.12);
(Continued)

(58) Field of Classification Search
CPC ..... B29C 64/106; B29C 64/118; B29C 70/38; B29C 70/382; B29C 70/384;
(Continued)

(56) References Cited

U.S. PATENT DOCUMENTS

| | | | |
|---|---|---|---|
| 10,254,499 B1 * | 4/2019 | Cohen | ...................... G02B 6/50 |
| 2012/0133080 A1 * | 5/2012 | Moussa | ................. B29C 64/112 |
| | | | 264/308 |

(Continued)

FOREIGN PATENT DOCUMENTS

| | | |
|---|---|---|
| CN | 107738441 A | 2/2018 |
| CN | 108068319 A | 5/2018 |

(Continued)

*Primary Examiner* — Andrew L Swanson
(74) *Attorney, Agent, or Firm* — Bayramoglu Law Offices LLC

(57)      ABSTRACT

An interlayer strengthening method for continuous fiber additive manufacturing based on pressure injected Z-pin-like structures is provided. A grid frame is printed with continuous fibers in horizontal slices of continuous fiber additive manufacturing, grid holes are regularly arranged and combined to form intermittent through spaces between layers, then thermosetting resin is injected into the spaces through pressure to build continuous longitudinally strengthened Z-pin-like structures across slice layers, and the resin is guided to penetrate and gradually fill universal interlayer pores in continuous fiber additive manufacturing by controlling resin filling extrusion pressure, thereby suppressing associated pore defects in additive manufacturing
(Continued)

without introducing other auxiliary energy fields, ultimately achieving interlayer strengthening, and improving overall performance.

3 Claims, 5 Drawing Sheets

(51) Int. Cl.

| | | |
|---|---|---|
| *B33Y 10/00* | (2015.01) | |
| *B33Y 50/00* | (2015.01) | |
| *B29C 64/118* | (2017.01) | |
| *B29K 101/10* | (2006.01) | |

(52) U.S. Cl.
CPC ............. *B33Y 50/00* (2014.12); *B29C 64/118* (2017.08); *B29K 2101/10* (2013.01)

(58) Field of Classification Search
CPC ... B29C 70/386; B29C 70/388; B29C 64/386; B29C 64/393; B33Y 50/00; B33Y 50/02
See application file for complete search history.

(56) References Cited

U.S. PATENT DOCUMENTS

| | | | | |
|---|---|---|---|---|
| 2017/0165920 | A1* | 6/2017 | Leavitt | B29C 64/118 |
| 2018/0311891 | A1* | 11/2018 | Duty | B29C 64/106 |
| 2019/0091927 | A1* | 3/2019 | Kunc | B29C 64/165 |
| 2019/0322347 | A1* | 10/2019 | Howe | B33Y 80/00 |
| 2020/0198233 | A1* | 6/2020 | Yang | B29C 64/245 |
| 2020/0198249 | A1* | 6/2020 | Jaster | B29C 39/02 |
| 2022/0024116 | A1* | 1/2022 | Hertling | B29C 64/386 |
| 2022/0184880 | A1* | 6/2022 | Barnes | B29C 70/38 |
| 2024/0066793 | A1 | 2/2024 | Kumar et al. | |

FOREIGN PATENT DOCUMENTS

| | | |
|---|---|---|
| CN | 112140528 A | 12/2020 |
| CN | 114147958 A | 3/2022 |
| CN | 114474709 A | 5/2022 |
| CN | 114953444 A | 8/2022 |
| CN | 116638751 A | 8/2023 |
| CN | 118046575 A | 5/2024 |
| JP | 2004009453 A | 1/2004 |

\* cited by examiner

Front sectional view

Front sectional view M

☐ Continuous fiber  ▨ Filling resin

Front sectional view

Layer 5
Layer 4
Layer 3
Layer 2
Layer 1

Top sectional view M

☐ Continuous fiber  ▨ Filling resin

▦ Inner filling resin

INTERLAYER STRENGTHENING METHOD FOR CONTINUOUS FIBER ADDITIVE MANUFACTURING BASED ON PRESSURE INJECTED Z-PIN-LIKE STRUCTURES

CROSS REFERENCE TO THE RELATED APPLICATIONS

This application is a continuation application of International Application No. PCT/CN2025/071941, filed on Jan. 13, 2025, which is based upon and claims priority to Chinese Patent Application No. 202410455738.0, filed on Apr. 16, 2024, the entire contents of which are incorporated herein by reference.

TECHNICAL FIELD

The present invention belongs to the technical field of high-end equipment manufacturing, and in particular, relates to an interlayer strengthening method for continuous fiber additive manufacturing based on pressure injected Z-pin-like structures.

BACKGROUND

The inherent attribute of "layer-by-layer stacking" in continuous fiber additive manufacturing determines its weak interlayer bonding state (manifested as pore defect distribution between layers), which is also the key to limiting the application of continuous fiber additive manufacturing. Different researchers have conducted extensive research on how to achieve interlayer strengthening for continuous fiber additive manufacturing, including forming auxiliary processes that use energy sources such as laser, infrared radiation, or hot rolling to promote the entanglement and connection of interlayer resin molecular chains during the forming process, as well as forming post-treatment processes that use ultrasonic compaction, vacuum hot pressing, etc. to reduce interlayer pore defects.

The above processes have certain limitations on shapes of target members (such as facing flat members or requiring molds), weakening the superiority of design freedom in additive manufacturing technology. Moreover, due to the lack of longitudinal strengthening structures in conventional additive manufacturing structures based on horizontal slices, the strengthening effects of the above processes are limited.

In fact, the mainstream technology for improving the interlayer performance of conventional composite laminates is Z-pin technology. Compared with other three-dimensional strengthening technologies such as three-dimensional weaving and stitching toughening, this technology has the advantages of easier operation, convenient control on process quality, etc., especially suitable for local strengthening, fabrication of lightweight and high-strength sandwich structures, and connection of composite materials. This technology is based on the concept of discontinuous sutures, utilizing the "pinning" bridging effect of micro diameter Z-pins. Currently, needle-like reinforced fibers are highly implanted in the thickness direction of members through ultrasonic technology to improve their performance, but local material damage may occur to lose some in-plane performance.

In conclusion, the lack of longitudinal strengthening structures is the core reason for the weak interlayer bonding state of current additive manufacturing parts, while the conventional Z-pin technology can introduce longitudinal structures by implanting reinforced fibers in the thickness direction of members with external force to improve interlayer performance, but is prone to damage to the in-plane performance. Therefore, considering the inherent pore defect distribution between the layers of additive manufacturing parts, if Z-pin structures are directly implanted into the parts, original defects will be expanded to degrade the overall performance, that is, the direct combination of the two technologies is limited in effects.

SUMMARY

To solve the above problems, the present invention discloses an interlayer strengthening method for continuous fiber additive manufacturing based on pressure injected Z-pin-like structures, with the purpose of providing a scheme of generating spatial composite paths with continuous fibers and thermosetting resin, so as to build continuous longitudinally strengthened Z-pin-like structures across slice layers through pressure injection of thermosetting resin in continuous fiber additive manufacturing based on horizontal slices, where the resin can be guided to penetrate and gradually fill universal interlayer pores in continuous fiber additive manufacturing by controlling injection pressure to form a resin network, so as to strengthen the interlayer bonding performance of continuous fiber additive manufacturing, suppress associated pore defects in additive manufacturing, and ultimately improve the overall performance of parts.

To achieve the above objective, the present invention provides the following solutions:

An interlayer strengthening method for continuous fiber additive manufacturing based on pressure injected Z-pin-like structures uses a continuous fiber print head and a thermosetting resin extrusion head for composite printing forming, where the continuous fiber print head prints a grid frame in an order of print layers; the thermosetting resin extrusion head fills grid holes in the corresponding print layers with resin through pressure injection; the grid holes in the overall continuous fiber frame form interlayer intermittent through spaces in a Z direction, the thermosetting resin filled by extrusion forms Z-pin-like structures in the spaces, and the resin penetrates and fills pores between the layers of the continuous fiber frame under the control of extrusion pressure, ultimately achieving the effect of interlayer strengthening for continuous fiber additive manufacturing, where the method includes the following steps:

step 1: setting a thickness t of a print layer, a size a×b of a grid hole of a continuous fiber grid frame, types of Z-pin-like structure units, a base extrusion pressure value p corresponding to the parameter group {t, a×b}, and extrusion pressure coefficient groups {$K_2$, $K_3$} corresponding to different types of Z-pin-like structure units;

step 2: segmenting a target model based on the thickness t of the print layer, the size a×b of the grid hole of the continuous fiber grid frame, and the types of the Z-pin-like structure units into a continuous fiber frame structure space area model and a Z-pin-like structure space area model which share a space coordinate system and have a same definition sequence of slice layers;

step 3: for the continuous fiber frame structure space area model, generating a path of the continuous fiber grid frame of each horizontal slice layer, to obtain print path information {$G_F$} of each horizontal slice from the continuous fiber print head, where the $i^{th}$-layer information is denoted as {$G_{Fi}$};

step 4: for the Z-pin-like structure space area model, processing horizontal slices, namely, marking fill areas corresponding to each Z-pin-like structure in each horizontal slice, to obtain extrusion information $\{G_M\}$ of relevant horizontal slice layers from the thermosetting resin extrusion head by combining the base extrusion pressure value p and the extrusion pressure coefficient groups $\{K_2, K_3\}$ of different types of Z-pin-like structure units, where the extrusion information includes extrusion positions and corresponding extrusion pressure for pressure injection in each slice layer, and the $i^{th}$-layer information is denoted as $\{G_{Mi}\}$;

step 5: combining the print information from the continuous fiber print head and the extrusion information from the thermosetting resin extrusion head in the relevant horizontal slice layers in an order of the horizontal slice layers from bottom to top, and outputting the print information from the continuous fiber print head and the extrusion information from the thermosetting resin extrusion head $\{G\}$ corresponding to each horizontal slice print layer, where the $i^{th}$-layer information is denoted as $\{G_i\}$; and step 6: performing collaborative printing forming through the continuous fiber print head and the thermosetting resin extrusion head based on respective operation information, and then letting the target model stand for curing.

Further, the thermosetting resin extrusion head has a rectangular cross-section and a same size a×b as grid holes, and can be inserted into the grid holes for pressure injection filling of resin.

Further, the Z-pin-like structure units have two layers and three layers in penetration depth, and the two structures are uniformly spaced apart within a horizontal plane in units, but each specific structure unit has only one structural form and is spaced apart from each other in a thickness direction. There are two forms of spatial distribution characteristics of Z-pin-like structure units:

① Horizontally spaced apart, as shown in FIG. 5.
② Horizontally/longitudinally spaced apart, as shown in FIG. 6.

Further, the types of Z-pin-like structure units correspond to different thermosetting resin extrusion pressure coefficient groups $\{K_2, K_3\}$, where $K_2$ and $K_3$ correspond to extrusion pressure coefficients required for extruding resin filled Z-pin-like structures in layers 2 and 3, respectively, and the coefficients are used for adjusting the base extrusion pressure when filling specific Z-pin-like structures.

Beneficial effects of the present invention are as follows:

(1) A scheme of generating spatial composite paths with continuous fibers and thermosetting resin is provided, where a grid frame is printed with continuous fibers in horizontal slices of continuous fiber additive manufacturing, grid holes are regularly arranged and combined to form intermittent through spaces between layers, and then thermosetting resin is injected into the spaces through pressure to build continuous longitudinally strengthened Z-pin-like structures across slice layers, thereby achieving interlayer strengthening in continuous fiber additive manufacturing.

(2) Based on the scheme of generating spatial composite paths with continuous fibers and thermosetting resin, the resin can be guided to penetrate and gradually fill universal interlayer pores in continuous fiber additive manufacturing by controlling the extrusion pressure when forming the Z-pin-like structures, thereby suppressing associated pore defects in additive manufacturing without introducing other auxiliary energy fields, and ultimately improving the overall performance of parts.

In the figures, 1—continuous fiber grid frame structure, 2—Z-pin-like structure, 2-1—Z-pin-like space filled with resin, 2-2—pore space filled with resin, 3—continuous fiber print head, 4—thermosetting resin extrusion head, 5—front section.

DETAILED DESCRIPTION OF THE EMBODIMENTS

The present invention will be further illustrated below in conjunction with the accompanying drawings and specific embodiments. It should be understood that the following specific embodiments are only used for explaining the present invention, rather than limiting the scope of the present invention. It should be noted that the terms "front", "back", "left", "right", "upper", and "lower" used in the following description refer to the directions in the accompanying drawings, and the terms "inside" and "outside" refer to the directions towards or away from the geometric center of a specific component respectively.

A target part is an 11×7×2.5 mm cube, continuous fibers are continuous carbon fiber reinforced PETG (polyethylene terephthalate-1,4-cyclohexanedimethanol ester) composite wires, and thermosetting resin is a mixture of bisphenol epoxy resin (FiberGlast System 4600) and a curing agent (System 4690). A thermosetting resin extrusion head 4 has a rectangular cross-section and a same size as grid holes, and is inserted into the grid holes for pressure injection filling of resin.

Figure 1:
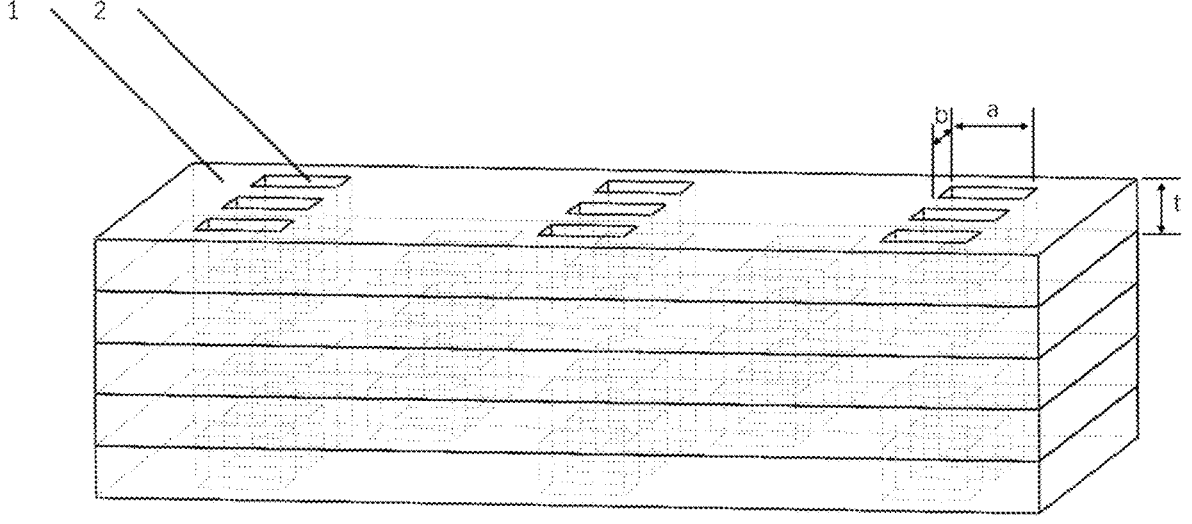
FIG. 1 illustrates a schematic diagram of step 2 of a forming scheme of composite printing with a continuous fiber print head and a thermosetting resin extrusion head in the present invention.
Figure 2:
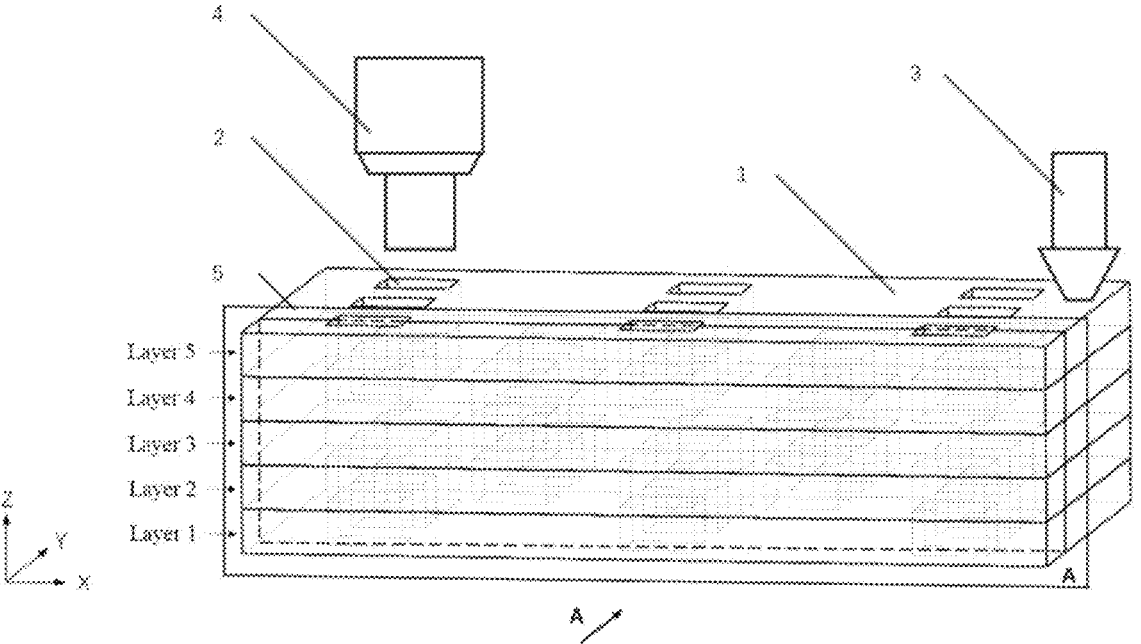
FIG. 2 illustrates a schematic diagram of printing a continuous fiber grid frame in step 5 of the forming scheme of composite printing with the continuous fiber print head and the thermosetting resin extrusion head in the present invention.
Figure 3:
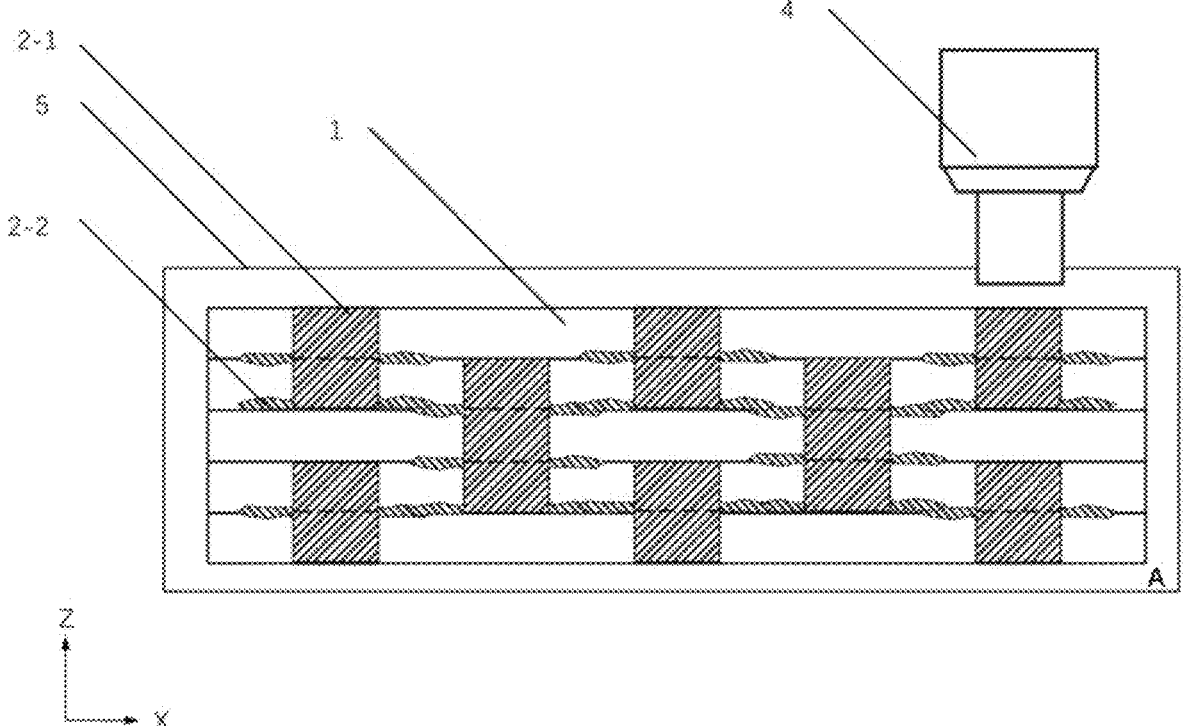
FIG. 3 illustrates a schematic diagram of filling with thermosetting resin under the control of extrusion information in step 5 of the forming scheme of composite printing with the continuous fiber print head and the thermosetting resin extrusion head in the present invention.

A forming scheme of composite printing with a continuous fiber print head 3 and the thermosetting resin extrusion head 4 is as follows:

Step 1: Set a thickness of a print layer to 0.5 mm, a size of a grid hole of a continuous fiber grid frame to 1×1 mm, a Z-pin-like structure unit to be shared by 2-layer and 3-layer structures, specific spatial distribution of Z-pin-like structure units to be horizontally spaced apart, a base extrusion pressure value p of 0.7 MPa, and an extrusion pressure coefficient group $\{1.4, 1.7\}$;

Step 2: Segment space areas of a continuous fiber frame structure 1 and Z-pin-like structures 2 in a target model based on the thickness of the print layer, the size of the grid hole of the continuous fiber grid frame, and types of the Z-pin-like structure units, as shown in FIG. 1;

Step 3: For the space area of the continuous fiber frame structure 1, generate a path of a continuous fiber grid frame of each horizontal slice layer, to obtain print path information $\{G_{Fi}\}$ of horizontal slices in layers 1-5 from the continuous fiber print head 3;

Step 4: For the space areas of the Z-pin-like structures 2, process horizontal slices, namely, mark fill areas corresponding to each Z-pin-like structure in the horizontal slices of layers 1-5, to obtain extrusion information $\{G_{Mi}\}$ of relevant horizontal slice layers from the thermosetting resin extrusion head 4 by combining the base extrusion pressure value p and the extrusion pressure coefficient groups $\{K_2, K_3\}$ of different types of Z-pin-like structure units;

Step 5: Combine the print information from the continuous fiber print head 3 and the extrusion information from the thermosetting resin extrusion head 4 in the relevant horizontal slice layers in an order of the horizontal slice layers from bottom to top, and output the print information from the continuous fiber print head 3 and the extrusion information from the thermosetting resin extrusion head 4 $\{G_i\}$ corresponding to the horizontal slice print layers 1-5. The continuous fiber grid frame in the overall print information is printed, as shown in FIG. 2. The thermosetting resin in the overall print information is printed by filling in Z-pin-like structure spaces 2-1 and pores 2-2 between the layers of the continuous fiber grid frame under the control of extrusion information, as shown in FIG. 3.

Figure 4:
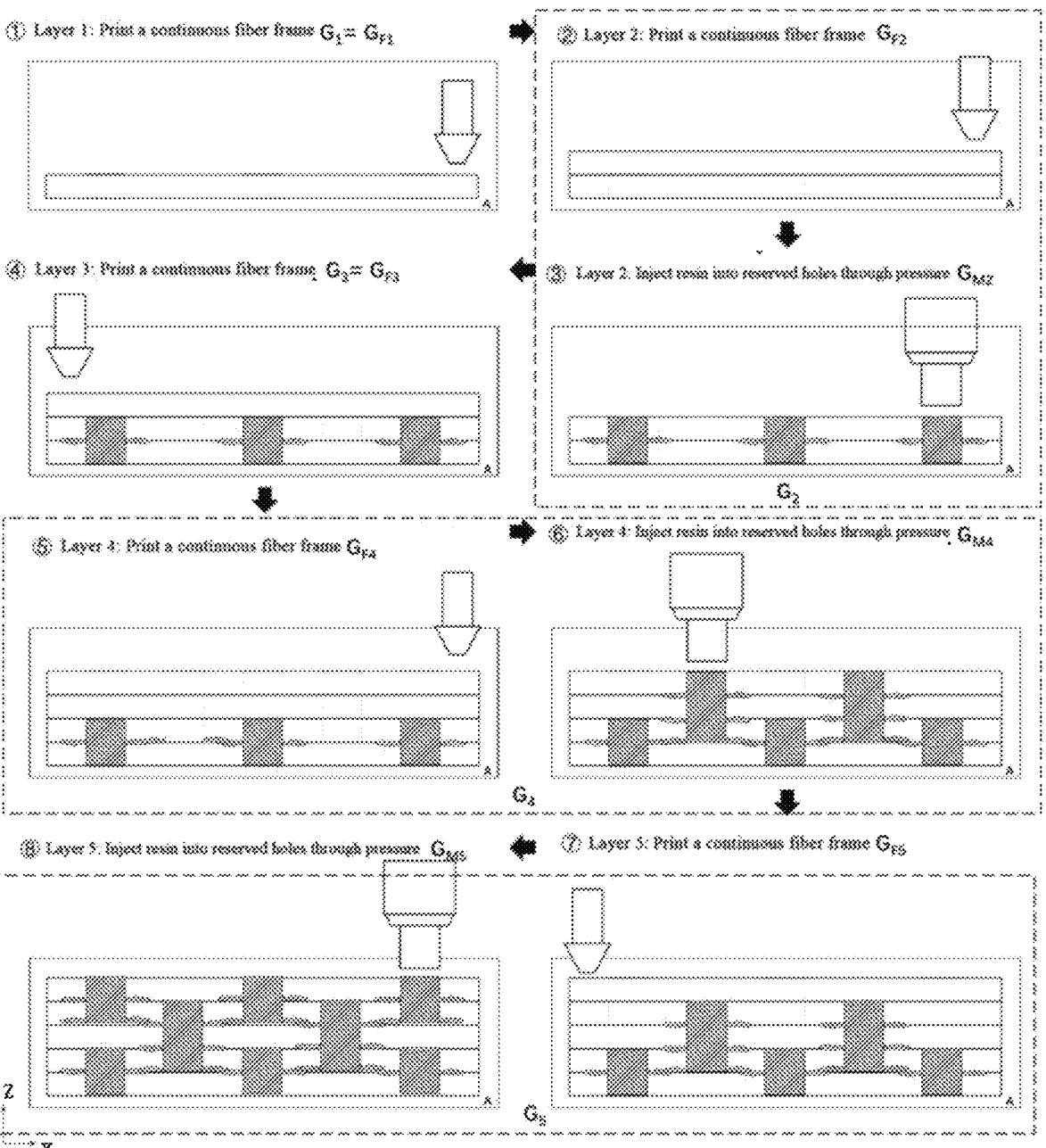
FIG. 4 illustrates a schematic diagram of step 6 of the forming scheme of composite printing with the continuous fiber print head and the thermosetting resin extrusion head in the present invention.
Figure 5:
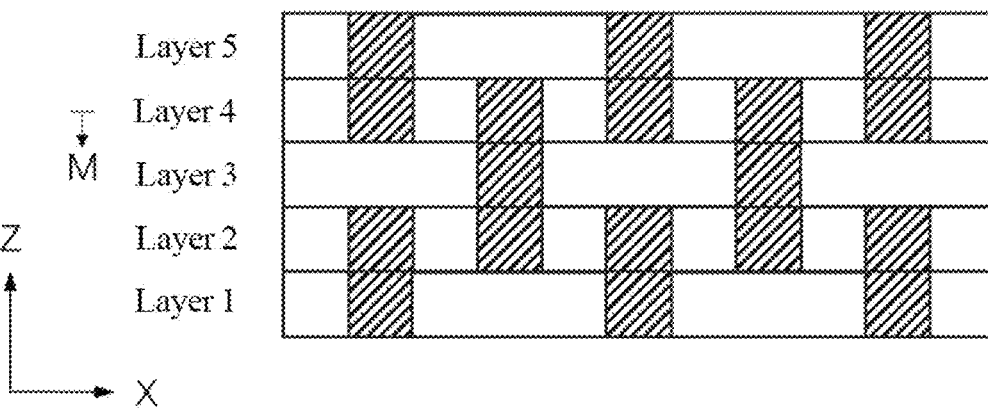
FIG. 5 illustrates a spatial distribution characteristic type of Z-pin-like structure units—horizontally spaced apart.
Figure 5:
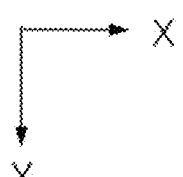
Figure 5:
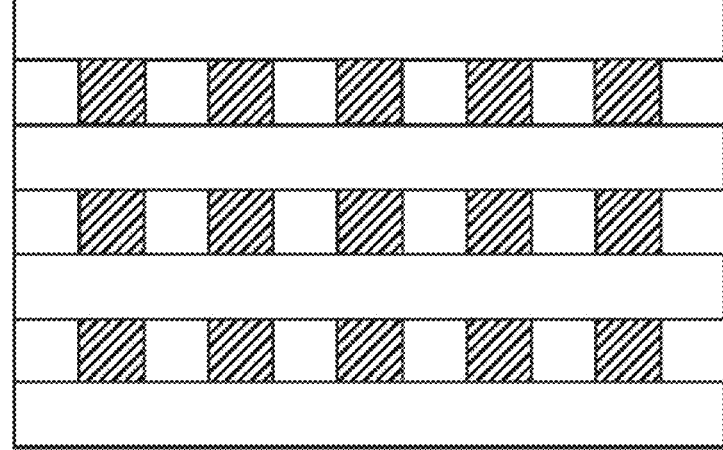
Figure 5:
Figure 6:
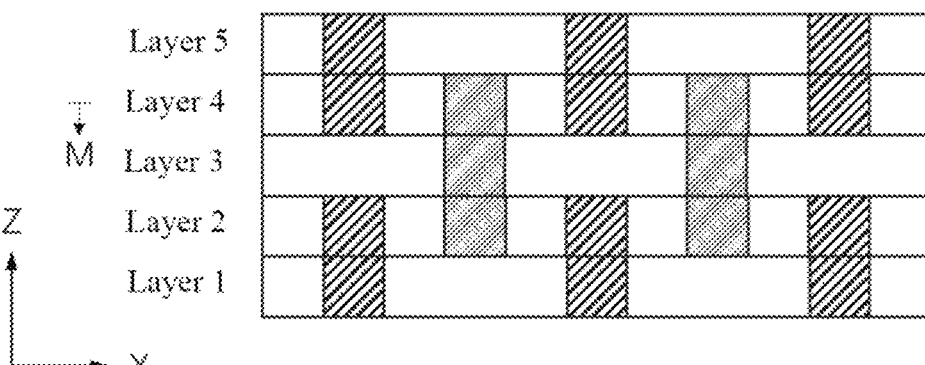
FIG. 6 illustrates a spatial distribution characteristic type of Z-pin-like structure units—horizontally/longitudinally spaced apart.
Figure 6:
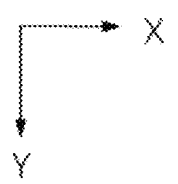
Figure 6:
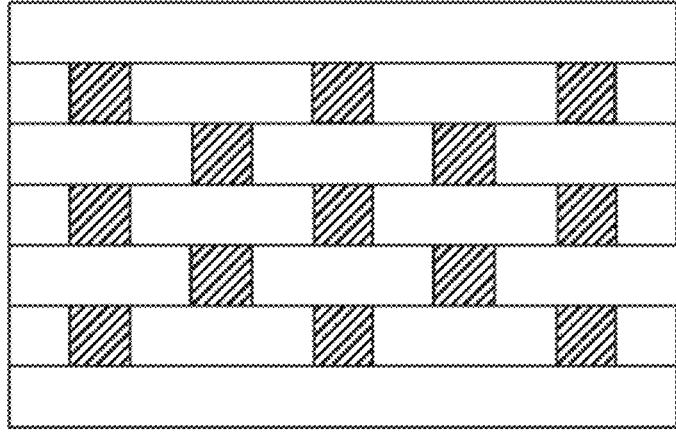
Figure 6:
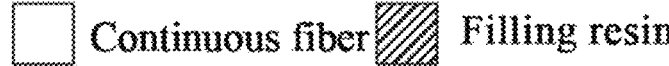
Figure 6:
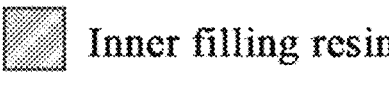

Step 6: Perform collaborative printing forming through the continuous fiber print head 3 and the thermosetting resin extrusion head 4 based on respective operation information as shown in FIG. 4, and then let the target model stand at room temperature (25° C.) for 20 h for curing.

The technical means disclosed in the solution of the present invention are not limited to the technical means disclosed in the foregoing implementations, but also include technical solutions formed by any combination of the above technical features.

What is claimed is:

1. An interlayer strengthening method for continuous fiber additive manufacturing based on pressure injected Z-pin-like structures, wherein a continuous fiber print head and a thermosetting resin extrusion head are configured for composite printing forming, wherein the continuous fiber print head prints a continuous-fiber-reinforced grid frame in an order of print layers; the thermosetting resin extrusion head fills grid holes in the corresponding print layers with a thermosetting resin through pressure injection; the grid holes in an overall continuous fiber grid frame are arranged and combined to form interlayer intermittent through spaces in a Z direction, the thermosetting resin filled by extrusion forms continuous longitudinally strengthened Z-pin-like structures across slice layers in the interlayer intermittent through spaces, and the thermosetting resin penetrates and fills pores between the print layers of the overall continuous fiber grid frame under a control of extrusion pressure and without introducing auxiliary energy fields, ultimately achieving an effect of interlayer strengthening for the continuous fiber additive manufacturing, wherein the interlayer strengthening method comprises the following steps:

step 1: setting a thickness t of each of the print layers, a size a×b of each of the grid holes of the overall continuous fiber grid frame, types of the Z-pin-like structures, a base extrusion pressure value p corresponding to a parameter group (t, a*b), and extrusion pressure coefficient groups (k2, k3) corresponding to different types of the Z-pin-like structures and depths of penetration;

step 2: segmenting a target model based on the thickness t of each of the print layers, the size a×b of each of the grid holes of the overall continuous fiber grid frame and the types of the Z-pin-like structures into a continuous fiber frame structure space area model and a Z-pin-like structure space area model, wherein the continuous fiber frame structure space area model and the Z-pin-like structure space area model share a space coordinate system and have a same definition sequence of slice layers;

step 3: for the continuous fiber frame structure space area model, generating a path of the overall continuous fiber grid frame of each horizontal slice layer, to obtain print path information $\{G_F\}$ of each horizontal slice from the continuous fiber print head, wherein $i^{th}$-layer information is denoted as $\{G_{Fi}\}$;

step 4: for the Z-pin-like structure space area model, processing horizontal slices comprising marking fill areas corresponding to each of the Z-pin-like structures in each of the horizontal slices, to obtain extrusion information $\{G_M\}$ of relevant horizontal slice layers from the thermosetting resin extrusion head by combining the base extrusion pressure value p and the extrusion pressure coefficient groups (k2, k3) of the different types and depths of the Z-pin-like structures, wherein the extrusion information comprises extrusion positions and corresponding extrusion pressure for the pressure injection in each slice layer, and the $i^{th}$-layer information is denoted as $\{G_{Mi}\}$;

step 5: combining print information from the continuous fiber print head and the extrusion information from the thermosetting resin extrusion head in the relevant horizontal slice layers in an order of the horizontal slice layers from bottom to top, and outputting the print information from the continuous fiber print head and the extrusion information from the thermosetting resin extrusion head $\{G\}$ corresponding to each horizontal slice print layer, wherein the $i^{th}$-layer information is denoted as $\{G_i\}$;

step 5a: during the pressure injection filling of thermosetting resin into grid holes, preforming a mandatory nozzle-wipe protocol after each filling operation, wherein the nozzle is moved along a zig-zag traversal path that avoids crossing unfilled holes, such that any residual resin is wiped against the infill line or the edge of the void, thereby preventing stringing and blockage of the nozzle and ensuring clean deposition for subsequent filling operations; and step 6: performing collaborative printing forming through the continuous fiber print head and the thermosetting resin extrusion head based on respective operation information, and then letting the target model stand for curing.

2. The interlayer strengthening method for the continuous fiber additive manufacturing based on the pressure injected Z-pin-like structures according to claim 1, wherein the thermosetting resin extrusion head has a rectangular cross-section and a same size a×b as the grid holes, and is inserted into the grid holes for pressure injection filling of the thermosetting resin.

3. The interlayer strengthening method for the continuous fiber additive manufacturing based on the pressure injected 5 Z-pin-like structures according to claim 1, wherein the Z-pin-like structures have two layers and three layers in a penetration depth, and two Z-pin-like structures are uniformly spaced apart within a horizontal plane in units, and the Z-pin-like structures are spaced apart from each other in 10 a thickness direction.

\* \* \* \* \*